(12) United States Patent
Zhang et al.

(10) Patent No.: US 12,306,728 B1
(45) Date of Patent: May 20, 2025

(54) ABNORMALITY DETECTION METHOD, APPARATUS AND SYSTEM, AND HOST DEVICE AND STORAGE MEDIUM

(71) Applicant: SUZHOU METABRAIN INTELLIGENT TECHNOLOGY CO., LTD., Jiangsu (CN)

(72) Inventors: Lianpin Zhang, Jiangsu (CN); Xiang Chen, Jiangsu (CN); Xixin Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,027

(22) PCT Filed: Jun. 16, 2023

(86) PCT No.: PCT/CN2023/100870
§ 371 (c)(1),
(2) Date: Dec. 21, 2024

(87) PCT Pub. No.: WO2024/098753
PCT Pub. Date: May 16, 2024

(30) Foreign Application Priority Data

Nov. 11, 2022 (CN) .......................... 202211409874.3

(51) Int. Cl.
*G06F 11/22* (2006.01)
*G06F 11/32* (2006.01)

(52) U.S. Cl.
CPC .......... *G06F 11/221* (2013.01); *G06F 11/327* (2013.01)

(58) Field of Classification Search
CPC ............................ G06F 11/221; G06F 11/327
See application file for complete search history.

(56) References Cited

U.S. PATENT DOCUMENTS 6,862,642 B1 * 3/2005 Packer ................ G06F 13/4045
710/312
7,082,488 B2 * 7/2006 Larson .................... H04L 41/12
370/257

(Continued)

FOREIGN PATENT DOCUMENTS

CN 107766200 A 3/2018
CN 111124818 A 5/2020

(Continued)

*Primary Examiner* — Matthew M Kim
*Assistant Examiner* — Indranil Chowdhury
(74) *Attorney, Agent, or Firm* — IPro, PLLC

(57) ABSTRACT

An abnormality detection method, device, host device, system and storage medium, the method comprises: shielding all channels in an I2C (Inter-Integrated Circuit) multiplexer, and detecting an I2C controller by using a CPLD (Complex Programmable logic device) to obtain a first detection result; when the first detection result is that the I2C controller is normal, controlling the I2C controller to detect the I2C multiplexer to obtain a second detection result; when the second detection result is that the I2C multiplexer is normal, opening the channels, and controlling the I2C controller to detect an I2C slave device connected to each channel to obtain a third detection result; when the third detection result is that the I2C slave device is normal, exiting detection; when there is an abnormal result in the first detection result, the second detection result and the third detection result, outputting an alarm information corresponding to the abnormal result.

20 Claims, 4 Drawing Sheets

(56) References Cited

U.S. PATENT DOCUMENTS

| | | | | |
|---|---|---|---|---|
| 7,478,286 B2 * | 1/2009 | Humphrey | ........ | G06F 13/4291 |
| | | | | 714/43 |
| 2002/0108076 A1 * | 8/2002 | Barenys | ............... | G06F 11/221 |
| | | | | 714/E11.161 |
| 2004/0117525 A1 * | 6/2004 | Lee | .................... | G06F 13/4045 |
| | | | | 710/104 |
| 2012/0131403 A1 * | 5/2012 | Chin | .............. | G01R 31/318533 |
| | | | | 714/E11.155 |
| 2012/0246510 A1 * | 9/2012 | Kojina | ................... | G06F 11/20 |
| | | | | 714/E11.079 |

FOREIGN PATENT DOCUMENTS

| | | | | | |
|---|---|---|---|---|---|
| CN | 111176952 | A | | 5/2020 | |
| CN | 112306867 | A | | 2/2021 | |
| CN | 114003445 | A | | 2/2022 | |
| CN | 114443394 | A | | 5/2022 | |
| CN | 114968681 | A | | 8/2022 | |
| CN | 115658409 | A | | 1/2023 | |
| EP | 1710709 | A2 | * | 10/2006 | ......... G06F 13/4291 |
| EP | 3349118 | B1 | * | 5/2020 | ......... G06F 11/0703 |
| GB | 2403315 | A | * | 12/2004 | ......... G06F 11/0727 |
| WO | 2010097831 | A1 | | 9/2010 | |

* cited by examiner

ABNORMALITY DETECTION METHOD, APPARATUS AND SYSTEM, AND HOST DEVICE AND STORAGE MEDIUM

CROSS-REFERENCE TO RELATED APPLICATION

This application claims the priority of Chinese patent application filed in CNIPA on Nov. 11, 2022, with the present disclosure number of 202211409874.3 and the present disclosure name of "Abnormality detection method, apparatus and system, and host device and storage medium", the entire contents of which are incorporated into the present disclosure by reference.

FIELD

The present disclosure relates to the field of I2C testing, in particular to an abnormality detection method, an abnormality detection apparatus, a host device, an abnormality detection system and a non-transitory computer-readable storage medium.

BACKGROUND

I2C device (Inter-Integrated Circuit, two-wire serial bus) is an important device in switch devices, which mainly includes an I2C controller, I2C Multiplexers and I2C Slave. In the related art, I2C devices are mainly detected manually, so the detection efficiency is low, and it is difficult to locate the fault position in the I2C devices, which is not conducive to efficient testing of switches.

SUMMARY

The purpose of the present disclosure is to provide an abnormality detection method, an apparatus, a host device, a system and a non-transitory computer-readable storage medium, which can automatically detect I2C controller, I2C multiplexer and I2C slave device in turn, and further improve the abnormality location efficiency of I2C devices.

In order to solve the above technical problems, the present disclosure provides an abnormality detection method, including:
  shielding all channels in an I2C (Inter-Integrated Circuit) multiplexer, and detecting an I2C controller by using a CPLD (Complex Programmable logic device) to obtain a first detection result;
  when the first detection result is that the I2C controller is normal, controlling the I2C controller to detect the I2C multiplexer to obtain a second detection result;
  when the second detection result is that the I2C multiplexer is normal, opening the channels, and controlling the I2C controller to detect an I2C slave device connected to each channel to obtain a third detection result;
  when the third detection result is that the I2C slave device is normal, exiting detection;
  when there is an abnormal result in the first detection result, the second detection result and the third detection result, outputting an alarm information corresponding to the abnormal result.

In some embodiments, before shielding all channels in an I2C multiplexer, the method further includes:
  detecting whether an I2C bus is abnormal by using the CPLD;
  if the I2C bus is abnormal, using the CPLD to shield all channels in the I2C multiplexer;
  if the I2C bus is normal, closing all channels in the I2C multiplexer.

In some embodiments, shielding all channels in an I2C multiplexer by using a CPLD includes:
  controlling the CPLD to send a reset GPIO signal to the I2C multiplexer to reset the I2C multiplexer.

In some embodiments, detecting whether an I2C bus is abnormal by using the CPLD includes:
  reading a serial clock signal and a serial data signal in the I2C bus by using the CPLD, and determining whether the serial clock signal and the serial data signal jump within a preset time;
  if the serial clock signal and the serial data signal do not jump within the preset time, determining that the I2C bus is abnormal.

In some embodiments, the method further includes:
  if the serial clock signal or the serial data signal jumps within the preset time, determining that the I2C bus is normal.

In some embodiments, detecting whether an I2C bus is abnormal by using the CPLD includes:
  reading a serial clock signal in the I2C bus by using the CPLD, and determining whether the serial clock signal remains at a low level for more than a preset time;
  if the serial clock signal remains at a low level for more than the preset time, determining that the I2C bus is abnormal.

In some embodiments, the method further includes:
  if the serial clock signal remains at a low level for less than the preset time, determining that the I2C bus is normal.

In some embodiments, after using the CPLD to shield all channels in the I2C multiplexer, the method further includes:
  detecting whether the I2C bus is abnormal again by using the CPLD;
  if the I2C bus is abnormal, determining that the I2C controller is abnormal;
  if the I2C bus is normal, entering a step of detecting the I2C controller by using the CPLD.

In some embodiments, detecting whether the I2C bus is abnormal again by using the CPLD includes:
  detecting whether the serial clock signal and the serial data signal in the I2C bus jump within a preset time by using the CPLD;
  if the serial clock signal and the serial data signal jump within a preset time, determining that the I2C bus is abnormal.

In some embodiments, detecting an I2C controller by using a CPLD includes:
  simulating the I2C slave device by using the CPLD, and recording specified data stored in a register of the CPLD;
  controlling the I2C controller to send an instruction of reading slave device register to the CPLD to read the specified data;
  determining whether data read by the I2C controller is the same as the specified data;
  determining that the I2C controller is normal if the data read by the I2C controller is the same as the specified data;
  determining that the I2C controller is abnormal if the data read by the I2C controller is different from the specified data.

In some embodiments, controlling the I2C controller to detect the I2C multiplexer includes:
  controlling the I2C controller to initiate a read operation to the I2C multiplexer;

determining that the I2C multiplexer is normal when determining that the I2C multiplexer responds to the read operation and returns correct response data;

determining that the I2C multiplexer is abnormal when determining that the I2C multiplexer does not respond to the read operation or returns wrong response data.

In some embodiments, opening the channels, and controlling the I2C controller to detect an I2C slave device connected to each channel includes:

sequentially opening the channels and controlling the I2C controller to detect the I2C slave devices connected to the channels.

In some embodiments, controlling the I2C controller to detect an I2C slave device connected to each channel includes:

controlling the I2C controller to initiate a read operation to the I2C slave device;

determining that the I2C slave device is normal when determining that the I2C slave device responds to the read operation and returns correct response data;

determining that the I2C slave device is abnormal when determining that the I2C slave device does not respond to the read operation or returns wrong response data.

In some embodiments, controlling the I2C controller to detect an I2C slave device connected to each channel includes:

using the CPLD to detect whether a bus level value of the I2C bus between the I2C controller and the I2C slave device in an idle state conforms to an I2C protocol specification;

when determining that the bus level value conforms to the I2C protocol specification, controlling the I2C controller to initiate a read operation to the I2C slave device, and extracting interactive communication values between the I2C controller and the I2C slave device when executing the read operation from the I2C bus by using the CPLD; wherein the communication values include an I2C START signal value, an I2C STOP signal value, a slave device address, an ACK response information of a slave device, a low level value of a serial clock signal and a low level value of a serial data signal;

using the I2C protocol specification to detect the I2C START signal value, the I2C STOP signal value, the ACK response information of the slave device, the low level value of the serial clock signal and the low level value of the serial data signal, and determining whether a slave device address to be tested used to control the I2C controller to initiate the read operation to the I2C slave device is the same as the slave device address extracted from the I2C bus;

determining that the I2C slave device is abnormal when determining that the bus level value does not conform to the I2C protocol specification, or that any of the I2C START signal value, the I2C STOP signal value, the ACK response information of the slave device, the low level value of the serial clock signal and the low level value of the serial data signal does not conform to the I2C protocol specification, or that the slave device address to be tested is different from the slave device address.

In some embodiments, using the CPLD to detect whether a bus level value of the I2C bus between the I2C controller and the I2C slave device in an idle state conforms to an I2C protocol specification includes:

using the CPLD to detect whether the serial clock signal and serial data signal in the I2C bus between the I2C controller and the I2C slave device conform to the I2C protocol specification.

The present disclosure also provides an abnormality detection apparatus, including:

an I2C controller detection module, configured to shield all channels in an I2C multiplexer and detecting an I2C controller by using a CPLD to obtain a first detection result;

an I2C multiplexer detection module, configured to control the I2C controller to detect the I2C multiplexer to obtain a second detection result when the first detection result is that the I2C controller is normal;

an I2C slave device detection module, configured to open the channels and control the I2C controller to detect an I2C slave device connected to each channel to obtain a third detection result when the second detection result is that the I2C multiplexer is normal;

an exit detection module, configured to exit detection when the third detection result is that the I2C slave device is normal;

an alarm module, configured to output an alarm information corresponding to an abnormal result when there is an abnormal result in the first detection result, the second detection result and the third detection result.

The present disclosure also provides a host device, including:

a memory, configured to store a computer program;

a processor, configured to implement an abnormality detection method described above when executing the computer program.

The present disclosure also provides an abnormality detection system including an I2C controller, an I2C multiplexer, an I2C slave device, a CPLD and a host device, wherein the host device is configured to execute an abnormality detection method described above.

The present disclosure also provides a non-transitory computer-readable storage medium, wherein computer executable instructions are stored in the non-transitory computer-readable storage medium, and when the computer executable instructions are loaded and executed by a processor, an abnormality detection method described above is implemented.

The present disclosure provides an abnormality detection method, which includes the following steps: shielding all channels in an I2C (Inter-Integrated Circuit) multiplexer, and detecting an I2C controller by using a CPLD (Complex Programmable logic device) to obtain a first detection result; when the first detection result is that the I2C controller is normal, controlling the I2C controller to detect the I2C multiplexer to obtain a second detection result; when the second detection result is that the I2C multiplexer is normal, opening the channels, and controlling the I2C controller to detect an I2C slave device connected to each channel to obtain a third detection result; when the third detection result is that the I2C slave device is normal, exiting detection; when there is an abnormal result in the first detection result, the second detection result and the third detection result, outputting an alarm information corresponding to the abnormal result.

It can be seen that, in the present disclosure, all channels in the I2C multiplexer can be shielded to eliminate an influence of the I2C slave devices and the I2C multiplexer on the I2C bus, and then an abnormal period can be determined between the I2C controller and the I2C multiplexer. Subsequently, the present disclosure can use a CPLD (Complex Programmable Logic Device) to detect the I2C controller, wherein the CPLD can detect faults of the I2C controller from a bottom layer to ensure reliability of I2C controller detection. When the I2C controller is determined to be normal, the I2C controller can be controlled to detect the abnormality of the I2C multiplexer to determine whether the I2C multiplexer and a path between the I2C multiplexer and the I2C controller are normal. When the I2C multiplexer is determined to be normal, the previously shielded channels can be redeveloped to detect the abnormality of the I2C slave devices by using the I2C controller. When it is determined that there is abnormality in the above devices, corresponding alarm information can be output to remind testers to maintain abnormal devices in time. In other words, the present disclosure can automatically detect the I2C controller, the I2C multiplexer and the I2C slave device in turn, which can greatly improve the abnormality detection efficiency, and can narrow a scope of locating abnormalities by shielding the I2C multiplexer, thereby improving the abnormality location efficiency of I2C devices. The present disclosure also provides an abnormality detection apparatus, a host device, a system and a non-transitory computer-readable storage medium, which have the above beneficial effects.

BRIEF DESCRIPTION OF THE DRAWINGS

In order to more clearly explain the embodiments of the present disclosure or the technical scheme in the prior art, the appended drawings needed to be used in the description of the embodiments or the prior art will be briefly introduced below. Apparently, the appended drawings in the following description are only the embodiments of the present disclosure. For persons skilled in the field, other drawings can be obtained according to the provided appended drawings without expenditure of creative labor.

DETAILED DESCRIPTION

In order to make the purpose, technical scheme and advantages of the embodiment of the present disclosure clearer, the technical scheme in the embodiment of the present disclosure will be described clearly and completely with the appended drawings. Apparently, the described embodiment is a part of the embodiment of the present disclosure, but not the whole embodiment. Based on the embodiments in the present disclosure, all other embodiments obtained by persons skilled in this field without expenditure of creative labor belong to the protection scope of the present disclosure.

Figure 1:
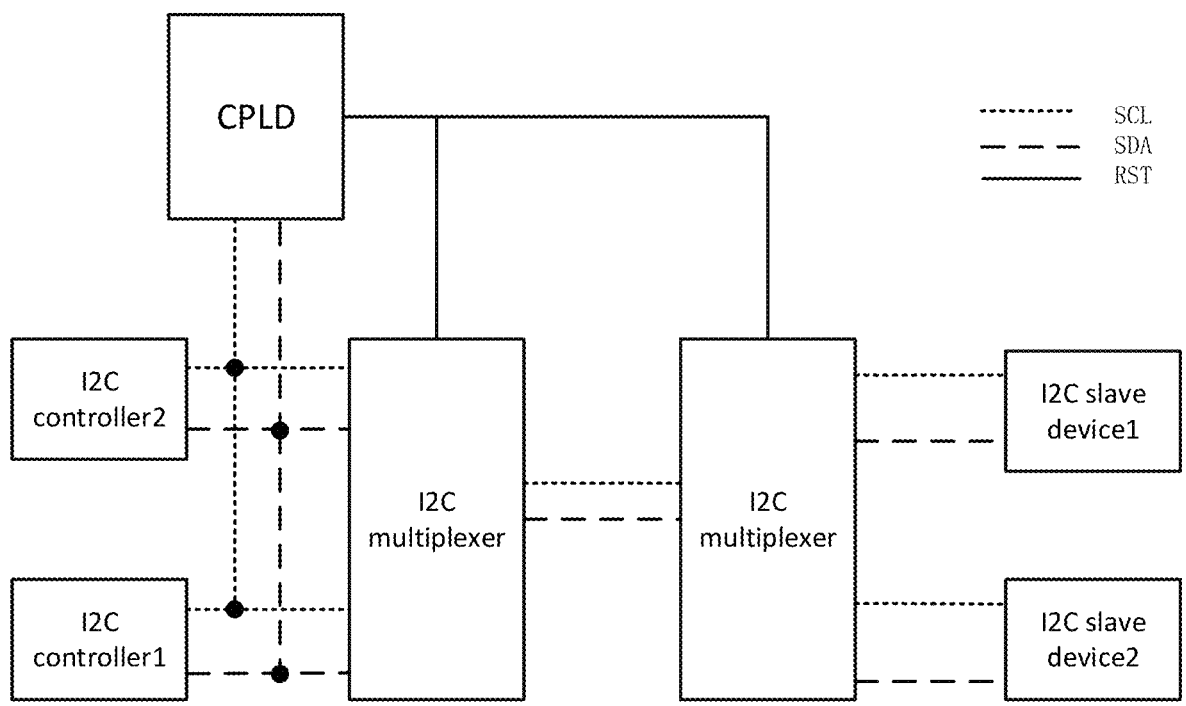
FIG. 1 is a structural block diagram of an abnormality detection system provided by an embodiment of the present disclosure.

In order to improve detection efficiency of I2C devices, the present disclosure can provide an abnormality detection method, which can automatically detect I2C controllers, I2C multiplexers and I2C slave devices in turn, thus improving the abnormality location efficiency of I2C devices. In order to facilitate understanding, firstly, the hardware system structure applicable to the present disclosure is introduced. Please refer to FIG. 1, which is a structural block diagram of an abnormality detection system provided by an embodiment of the present disclosure. The system is mainly composed of an I2C controller, an I2C multiplexer, an I2C slave device and a CPLD (Complex Programmable Logic Device), wherein the CPLD is an additional device connected to the I2C bus to realize automatic detection of I2C devices in the embodiments of the present disclosure. The I2C controller and the CPLD are directly connected with the host device (not shown) and are directly controlled by the host device. There is an I2C bus connection between the I2C controller, I2C multiplexer and I2C slave devices, and the bus contains two kinds of signal lines, namely SCL (Serial Clock Line) and SDA (Serial Data Line), which are the main signal lines for automatic detection of I2C devices in the embodiments of the present disclosure. In order to detect a data transmission in the I2C bus, the CPLD is also connected with the above two signal lines. It is specifically connected with the SCL signal line and the SDA signal line between the I2C controller and the I2C multiplexer, so that it can be detected close to a main control terminal in the I2C bus to improve the efficiency of abnormality location. Further, in the embodiments of the present disclosure, all channels in the I2C multiplexer need to be temporarily shielded. Considering that the I2C multiplexer is difficult to be shielded by normal means when it is abnormal, in some embodiments, a Reset signal line (RST, Reset) can be set between the CPLD and the I2C multiplexer to shield the abnormal I2C multiplexer by resetting. In particular, the CPLD can be a device added to switch equipment specifically for realizing automatic detection of I2C devices. Certainly, it can also be an original device of the switch equipment, which is only connected to the I2C bus additionally, without modifying its original function, and can be set according to actual needs. It should be noted that the embodiments of the present disclosure do not limit a specific amount of the I2C controllers, the I2C multiplexers and the I2C slave devices. It can be understood that when there are a relatively large amount of I2C controllers, I2C multiplexers and I2C slave devices, the structure of this abnormality detection system may be far more complicated than the system shown in FIG. 1, but only the CPLD directly connected to the host device needs to be connected to the I2C bus according to the connection mode shown in FIG. 1.

Figure 2:
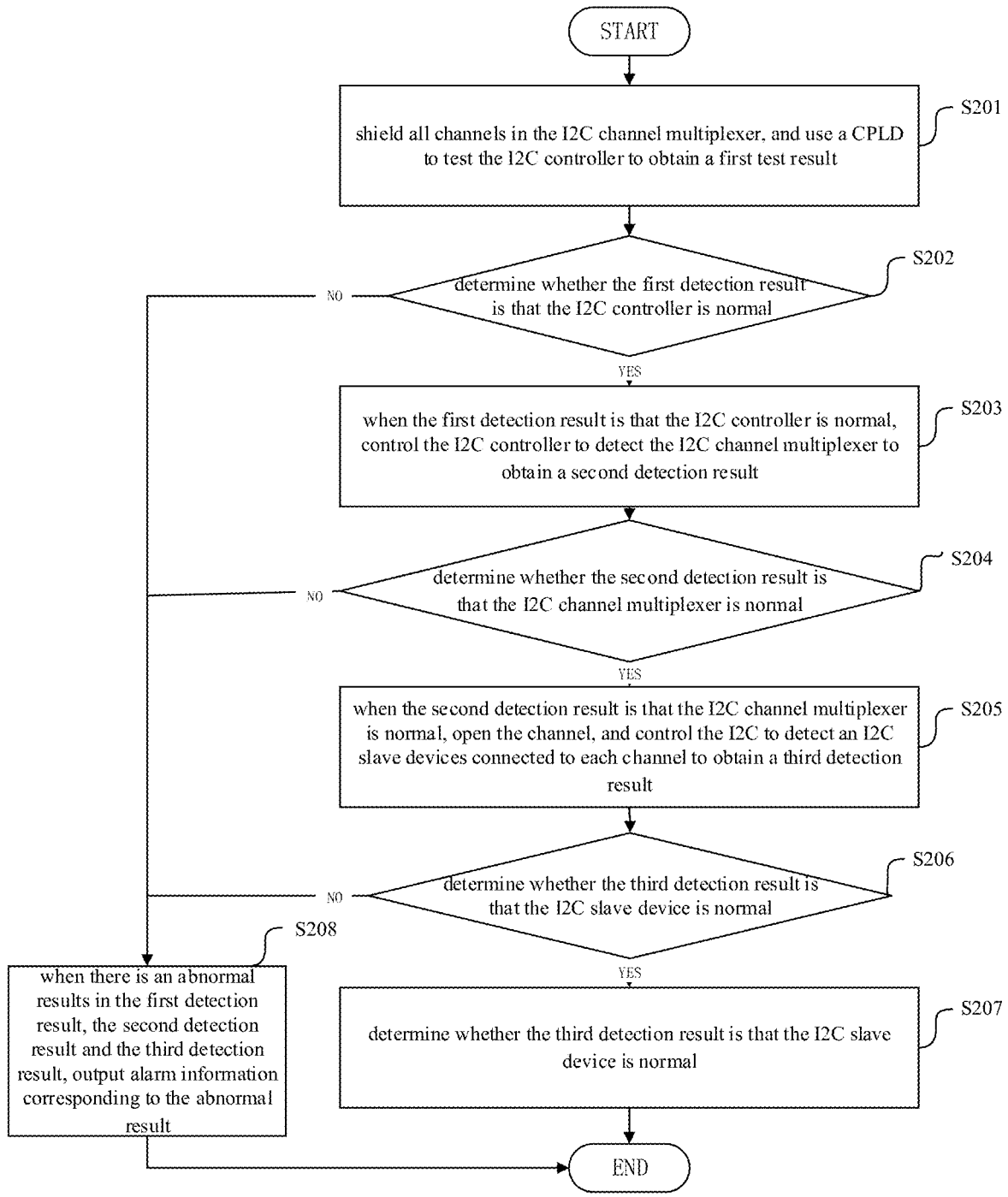
FIG. 2 is a flowchart of an abnormality detection method provided by an embodiment of the present disclosure.

Based on the above description, the abnormality detection method provided by the embodiment of the present disclosure will be introduced in detail below. Please refer to FIG. 2, which is a flowchart of an abnormality detection method provided by an embodiment of the present disclosure. The method may include the following steps.

S201: shielding all channels in the I2C multiplexer, and using a CPLD to test the I2C controller to obtain a first test result.

In the embodiment of the present disclosure, the I2C multiplexer can be shielded first, and then the I2C controller can be detected by using the CPLD after shielding. A purpose of shielding the I2C multiplexer is to eliminate an interference of the I2C slave devices on the I2C bus, and to temporarily narrow a range of abnormality location between the I2C controller and the I2C multiplexer, to improve the efficiency of abnormality location. The purpose of using the CPLD to detect the I2C controller is to detect the specific working state of the I2C controller from a bottom layer to improve the detection reliability. Secondly, the I2C controller and the CPLD are both devices directly controlled by the host device, and the CPLD is a device specially connected to I2C bus for detecting the abnormal situation of I2C devices, so the host device can control the I2C controller to interact with the CPLD, and determine whether the I2C controller is normal by detecting whether an interaction process is normal, so as to further narrow a range of abnormality location to the I2C controller itself to improve the efficiency of abnormality location. Specifically, considering that CPLD is programmable, it can be simulated as an I2C slave device, and then the host device can control the I2C controller to interact with the CPLD in a way of controlling the I2C slave device, and determine whether the I2C controller is normal by detecting whether the interaction process is normal. It should be noted that the embodiments of the present disclosure do not limit the specific interactive content between the I2C controller and the CPLD, and can choose from the existing interactive content between the I2C controller and the I2C slave device. Preferably, the interactive content can be a register reading operation, that is, the I2C controller sends a reading instruction of a slave device register to the CPLD, and the CPLD responds to the instruction and returns the specified data in the register to the I2C controller; Subsequently, the host device can determine whether the I2C controller is normal by comparing whether the data read by the I2C controller is the same as the above specified data.

In one possible case, using CPLD to detect I2C controller may include:
  step 11: emulating the I2C slave device by using the CPLD, and recording specified data stored in a register of the CPLD;
  step 12: controlling the I2C controller to send an instruction of reading slave device register to the CPLD to read the specified data;
  step 13: determining whether data read by the I2C controller is the same as the specified data; if the data read by the I2C controller is the same as the specified data, proceeding to step 14; if the data read by the I2C controller is different from the specified data, proceeding to step 15;
  step 14: determining that the I2C controller is normal;
  step 15: determining that the I2C controller is abnormal.

It should be noted that the embodiment of the present disclosure does not limit the specific instruction of reading slave device register, nor does it limit the specific data that the I2C controller needs to acquire, and it can be set according to the actual application requirements.

Further, it should be noted that the embodiment of the present disclosure is not limited to the way of shielding all channels in the I2C multiplexer. For example, when the I2C bus is normal, the I2C multiplexer can be directly turned off by the I2C controller; For another example, when the I2C bus is abnormal (I2C bus hung), the I2C multiplexer cannot be turned off in a normal way at this time. Therefore, the embodiment of the present disclosure can also connect the CPLD and the I2C multiplexer, and can directly shield the I2C multiplexer by using the CPLD. Understandably, the host device can first detect whether the I2C bus between the I2C controller and the I2C multiplexer is normal by the CPLD, and then decide whether to shield the I2C multiplexer by the CPLD.

In a possible case, before shielding all channels in the I2C multiplexer, the method may further include:
  step 21: using the CPLD to detect whether the I2C bus is abnormal; if the I2C bus is abnormal, proceeding to step 22; if the I2C bus is normal, proceeding to step 23;
  step 22: using the CPLD to shield all channels in the I2C multiplexer.
  step 23: closing all channels in the I2C multiplexer.

Specifically, a reset signal line can be set between the CPLD and the I2C multiplexer, and the CPLD can send a GPIO (General-purpose input/output) signal to I2C multiplexer to reset the I2C multiplexer. At this time, because the original configuration of I2C multiplexer has been erased, that is, the signal of I2C slave device cannot be transmitted, so it can also play a shielding effect.

In one possible case, using the CPLD to shield all channels in I2C multiplexer may include:
  step 31: controlling the CPLD to send reset GPIO signal to the I2C multiplexer to reset the I2C multiplexer.

It should be noted that the embodiment of the present disclosure does not limit the specific reset GPIO signal, and it can refer to the related technologies of I2C multiplexers. It should be pointed out in particularly that the I2C multiplexer needs to be restored after it is reset, and a restoration process will affect the abnormality detection efficiency to a certain extent. Therefore, the embodiment of the present disclosure only resets the I2C multiplexer when it is determined that the I2C bus is abnormal.

Certainly, it can be understood that after the CPLD resets the I2C multiplexer, the signal in the I2C bus is only generated by the I2C controller at this time. If the I2C bus is still abnormal at this time, it can be directly determined that the I2C controller is abnormal. Therefore, after shielding the I2C multiplexer by using the CPLD, the embodiment of the present disclosure can detect whether there is abnormality in the I2C bus again by using the CPLD, and if so, it can be determined that there is abnormality in the I2C controller.

In a possible case, after shielding all channels in the I2C multiplexer by using the CPLD, the method can also include:
  step 41: using the CPLD to detect whether I2C bus is abnormal again; if the I2C bus is abnormal, proceeding to step 42; if the I2C bus is normal, proceeding to step 43;
  step 42: determining that the I2C controller is abnormal;
  step 43: entering the step of detecting the I2C controller by the CPLD.

Further, it should be noted that the embodiment of the present disclosure is not limited to how to determine whether there is abnormality in the I2C bus, specifically, whether there is abnormality in the I2C bus can be determined by detecting a situation of jumps of the serial clock signal and the serial data signal in the I2C bus and a duration of remaining at a certain type of level.

Specifically, since both the serial clock signal and the serial data signal will jump in a short time during normal communication, the embodiment of the present disclosure can detect whether the above two signals jump within a preset time (for example, 500 ms), so as to determine whether the I2C bus is abnormal.

In one possible case, using the CPLD to detect whether the I2C bus is abnormal may include:

step 51: reading a serial clock signal and a serial data signal in the I2C bus by using the CPLD, and determining whether the serial clock signal and the serial data signal jump within a preset time; if the serial clock signal and the serial data signal jump within the preset time, then proceeding to step 52; if the serial clock signal or serial data signal does not jump within the preset time, then proceeding to step 53;

step 52: determining that the I2C bus is normal or executing other detection contents;

step 53: determining that the I2C bus is abnormal.

For another example, in the normal communication process, the serial clock signal will not remain at a low level for a long time, so the embodiment of the present disclosure can also detect whether the time that the serial clock signal remains at the low level exceeds a preset threshold (for example, 500 ms), so as to determine whether the I2C bus is abnormal.

In one possible case, using the CPLD to detect whether the I2C bus is abnormal includes:

step 61: reading a serial clock signal in the I2C bus by using the CPLD, and determining whether the serial clock signal remains at a low level for more than a preset time; If the serial clock signal remains at a low level for more than the preset time, proceeding to step 62; if the serial clock signal remains at a low level for less than the preset time, proceeding to step 63;

step 62: determining that the I2C bus is abnormal.

step 63: determining that the I2C bus is normal or executing other detection contents.

It should be pointed out that the above two detection methods can be combined, and the execution order of the above two detection methods is not limited in the embodiment of the present disclosure, and they can be detected in parallel or in sequence, and can be set according to actual application requirements.

S202, determining whether the first detection result is that the I2C controller is normal; if the first detection result is that the I2C controller is normal, proceeding to step S203; if the first detection result is that the I2C controller is abnormal, proceeding to step S208;

S203: when the first detection result is that the I2C controller is normal, controlling the I2C controller to detect the I2C multiplexer to obtain a second detection result.

After determining that the I2C controller is normal, it can further detect whether the I2C multiplexer is abnormal. Specifically, the I2C controller can be controlled to interact with the I2C multiplexer to determine whether the I2C multiplexer is normal according to the execution of the interaction. The embodiment of the present disclosure is not limited to detecting the I2C multiplexer, and the specific interaction content that the I2C controller needs to perform with the I2C multiplexer can be referred to the relevant technologies of I2C and selected by combining with the actual application requirements. Specifically, the I2C controller can be controlled to initiate a read operation to the I2C multiplexer to read the register of the I2C multiplexer. If the I2C multiplexer responds to the above read operation and returns correct response data, it can be determined to be normal. On the other hand, if the I2C multiplexer does not respond to the above read operation, or returns wrong response data, such as garbled code, it can be determined that there is an abnormal situation in the I2C multiplexer.

In one possible case, controlling the I2C controller to detect the I2C multiplexer may include:

step 71: controlling the I2C controller to initiate a read operation to the I2C multiplexer;

step 72: determining that the I2C multiplexer is normal when determining that the I2C multiplexer responds to the read operation and returns correct response data;

step 73: determining that the I2C multiplexer is abnormal when determining that the I2C multiplexer does not respond to the read operation or returns wrong response data.

It should be noted that the embodiment of the present disclosure does not limit how the I2C controller reads the register of the I2C multiplexer, and it can refer to the related technologies of I2C.

S204, determining whether the second detection result is that the I2C multiplexer is normal; if the second detection result is that the I2C multiplexer is normal, proceeding to step S205; if the second detection result is that the I2C multiplexer is abnormal, proceeding to step S208.

S205, when the second detection result is that the I2C multiplexer is normal, opening the channels, and controlling the I2C controller to detect an I2C slave device connected to each channel to obtain a third detection result.

After determining that the I2C multiplexer is normal, the previously shielded channels can be opened and the I2C slave device connected to each channel is detected. Certainly, in order to improve the efficiency of abnormality location, the above channels can be opened in turn, and each time the channels are opened, the I2C slave devices corresponding to the currently opened channels are detected.

In one possible case, opening channels and controlling the I2C controller to detect a I2C slave device connected to each channel includes:

step 81: sequentially opening the channels and controlling the I2C controller to detect the I2C slave devices connected to the channels.

Further, the I2C controller can be controlled to interact with the I2C slave device to determine whether the I2C slave device is normal according to the execution of the interaction. The embodiment of the present disclosure is not limited to detecting I2C slave devices, and the specific interaction content that I2C controller needs to perform with I2C slave devices can be referred to I2C related technologies and selected by combining with actual application requirements. Specifically, the controllable I2C controller initiates a read operation to the I2C slave device to read the register of the I2C slave device. If the I2C slave device responds to the above read operation and returns correct response data, it can be determined to be normal. On the other hand, if the I2C slave device does not respond to the above read operation, or returns wrong response data, such as garbled code, it can be determined that there is an abnormal situation in the I2C slave device.

In one possible case, controlling the I2C controller to detect an I2C slave device connected to each channel may include:

step 91: controlling the I2C controller to initiate a read operation to the I2C slave device;

step 92: determining that the I2C slave device is normal when determining that the I2C slave device responds to the read operation and returns correct response data;

step 93: determining that the I2C slave device is abnormal when determining that the I2C slave device does not respond to the read operation or returns wrong response data.

S206, determining whether the third detection result is that the I2C slave device is normal; if the third detection result is that the I2C slave device is normal, proceeding to step S207; if the third detection result is that the I2C slave device is abnormal, proceeding to step S208;

S207: when the third detection result is that the I2C slave device is normal, exiting the detection.

S208: when there is an abnormal result in the first detection result, the second detection result and the third detection result, outputting alarm information corresponding to the abnormal result.

In the detection process, when abnormal devices are found in the I2C controller, I2C multiplexer and I2C slave devices, that is, when it is determined that there is the abnormal result in the first detection result, the second detection result and the third detection result, corresponding alarm information can be output, so that testers can maintain the corresponding I2C devices in time.

Based on the above embodiments, in the present disclosure, all channels in the I2C multiplexer can be shielded to eliminate an influence of the I2C slave devices and the I2C multiplexer on the I2C bus, and then an abnormal period can be determined between the I2C controller and the I2C multiplexer. Subsequently, the present disclosure can use a CPLD (Complex Programmable Logic Device) to detect the I2C controller, wherein the CPLD can detect faults of the I2C controller from a bottom layer to ensure reliability of I2C controller detection. When the I2C controller is determined to be normal, the I2C controller can be controlled to detect the abnormality of the I2C multiplexer to determine whether the I2C multiplexer and a path between the I2C multiplexer and the I2C controller are normal. When the I2C multiplexer is determined to be normal, the previously shielded channels can be redeveloped to detect the abnormality of the I2C slave devices by using the I2C controller. When it is determined that there is abnormality in the above devices, corresponding alarm information can be output to remind testers to maintain abnormal devices in time. In other words, the present disclosure can automatically detect the I2C controller, the I2C multiplexer and the I2C slave device in turn, which can greatly improve the abnormality detection efficiency, and can narrow a scope of locating abnormalities by shielding the I2C multiplexer, thereby improving the abnormality location efficiency of I2C devices.

Based on the above embodiments, it should be pointed out that the I2C bus is a low-speed bus that is widely used in switches and servers. Features of this bus are simple hardware design, PCB wiring and simple software design and use. However, another feature of I2C bus is that it is an unreliable bus, so there may be access failures in a production of products and an operation after the products are launched. In the related technology, the related faults of I2C slave devices can only be detected manually, and the detection efficiency is low. Moreover, it is difficult to further analyze fault types of I2C slave devices only by relying on I2C controller to detect I2C slave devices. Just like this, CPLD can also be used to detect the bus communication value between the I2C controller and the I2C slave devices, to further improve the fault analysis efficiency of I2C slave device. In one possible case, controlling the I2C controller to detect the I2C slave device connected to each channel may include the following steps.

S301, using the CPLD to detect whether a bus level value of the I2C bus between the I2C controller and the I2C slave device in an idle state conforms to an I2C protocol specification.

The embodiment of the present disclosure can firstly use CPLD to detect whether the bus level value of the bus between I2C controller and I2C slave device in the idle state conforms to the I2C protocol specification, for example, it can detect whether the serial clock signal and serial data signal in I2C bus conform to the I2C protocol specification. When it is determined that the bus level value does not conform to the I2C protocol specification, it can be determined that the I2C slave device has a fault of poor monomer or poor welding, and the fault type of the I2C slave device can be determined as abnormal idle bus signal at the same time, so that relevant personnel can check the I2C slave device fault.

It should be pointed out that in order to achieve the best detection effect, it should be ensured that the I2C controller communicates with only one I2C slave device. In other words, other I2C slave devices except the I2C slave device to be tested can be shielded, and then the I2C slave device to be tested can be tested.

S302, when determining that the bus level value conforms to the I2C protocol specification, controlling the I2C controller to initiate a read operation to the I2C slave device, and extracting interactive communication values between the I2C controller and the I2C slave device when executing the read operation from the I2C bus by using the CPLD; wherein the communication values comprise an I2C START signal value, an I2C STOP signal value, a slave device address, an ACK response information of a slave device, a low level value of a serial clock signal and a low level value of a serial data signal.

When it is determined that the bus level value meets the requirements, the host device can control the I2C controller to initiate a read operation to the I2C slave device, and use a CPLD to detect the interactive process of the read operation between the two devices in detail. Specifically, the host device can read the communication values such as I2C START signal value, I2C STOP signal value, slave device address, ACK response information of slave device, serial clock signal low level value and serial data signal low level value between the I2C controller and the I2C slave device from the I2C bus by using the CPLD, and use I2C protocol specification and other known information to detect the above communication values. Wherein, the I2C START signal value, I2C STOP signal value, slave device address and ACK response information of slave device are communication values that generally need to be transmitted in reading operation, and the I2C START signal value, I2C STOP signal value and ACK response information of slave device can be directly compared and detected with the I2C protocol specification; The address of the slave device is related to the specific I2C slave device, and should be sent to the I2C slave device by the I2C controller. However, due to factors such as welding and monomer failure, the address of the slave device transmitted in the I2C bus may be different from the expected one, resulting in the I2C slave device not responding to the read operation correctly, so it needs to be compared with the address of the slave device to be tested used by the host device to control the I2C controller to initiate the read operation to the I2C slave device. Similarly, due to factors such as welding and monomer failure, when the serial clock signal and the serial data signal are pulled to a low level, their corresponding voltage values may not meet the requirements of the I2C protocol specification, which leads to the I2C controller or I2C slave device being unable to determine that the serial clock signal and the serial data signal have been pulled to the low level, so the present disclosure will also detect the low level values of the serial clock signal and the serial data signal.

S303, using the I2C protocol specification to detect the I2C START signal value, the I2C STOP signal value, the ACK response information of the slave device, the low level value of the serial clock signal and the low level value of the serial data signal, and determining whether a slave device address to be tested used to control the I2C controller to initiate the read operation to the I2C slave device is the same as the slave device address extracted from the I2C bus.

S304, determining that the I2C slave device is abnormal when determining that the bus level value does not conform to the I2C protocol specification, or that any of the I2C START signal value, the I2C STOP signal value, the ACK response information of the slave device, the low level value of the serial clock signal and the low level value of the serial data signal does not conform to the I2C protocol specification, or that the slave device address to be tested is different from the slave device address.

Since the embodiment of the present disclosure can detect several communication values between the I2C controller and the I2C slave device, when it is determined that the above communication values are abnormal, not only the I2C slave device can be determined to be abnormal, but also the communication values can be specifically determined to be abnormal, thereby improving the efficiency of determining the failure type of the I2C slave device. For this reason, the present disclosure can bring many benefits to the production and latter maintenance of servers and switches. For example, in the production process, the automatic fault analysis tool of the present disclosure can quickly locate the causes and give guidance on fault handling; Moreover, the fault data can be counted as an important data reference base for the production line detection method and the optimization of incoming material detection of I2C devices. Moreover, because CPLD used in the present disclosure is a common component in server and switch equipment, when faced with a problem of probabilistic failure of I2C slave reading and writing function, the failure cause of I2C slave can be analyzed without disassembling the machine or using an external oscilloscope or protocol analyzer, thereby greatly improving the efficiency of analyzing the failure cause of I2C slave and reducing the analysis cost.

Figure 3:
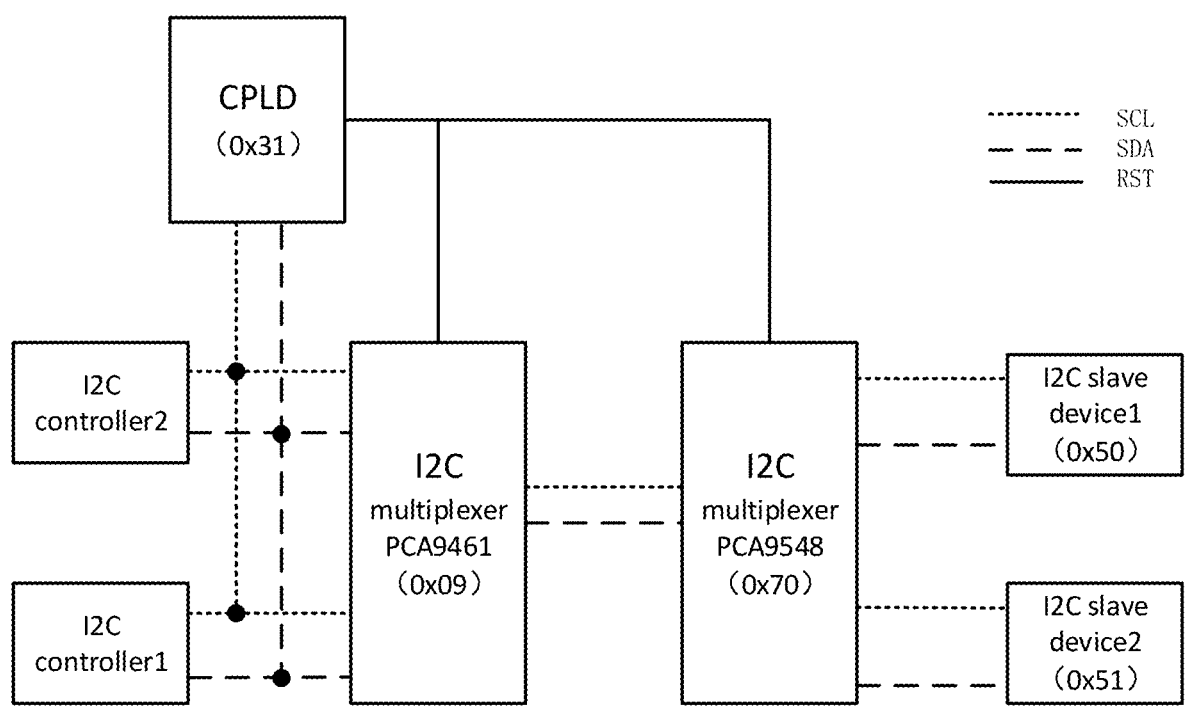
FIG. 3 is a structural block diagram of another abnormality detection system provided by an embodiment of the present disclosure.

The following introduces the above abnormality detection methods with specific examples. Please refer to FIG. 3, which is a structural block diagram of another abnormality detection system provided by the embodiment of the present disclosure, wherein 0x31, 0x09, 0x70, 0x50 and 0x51 are the addresses of CPLD, I2C multiplexer PCA9461, I2C multiplexer PCA9548, I2C slave device 1 and I2C slave device 2 respectively.

In the embodiment of the present disclosure, the bus number (bus) of the I2C controller 1 is assumed to be 1. CPLD module specifically implements the following functions.

1. Detect states of SDA and SCL signals;
2. Output GPIO signal (for resetting PCA9641 and PCA 9548);
3. Simulate the function of a standard I2C slave device (address is 0x31).

When I2C detection is abnormal, CPLD is first used to detect whether bus hung (bus hang, that is, I2C bus is abnormal) occurs in SDA and SCL, this is illustrated by the occurrence of I2C bus hung.

1. Control CPLD to send GPIO commands to reset PCA9641 and PCA9548. After PCA9641 and PCA9548 are reset, all downstream I2C channels will be closed. This means that there are only I2C controllers and I2C multiplexers on the I2C bus, which reduces the fault range.
2. Then use CPLD to detect the link state of I2C bus again. If it is still I2C bus hung, it can be determined that the I2C controller is faulty. If the link state of I2C bus is normal, it is necessary to continue to analyze the fault point.
3. Use I2C controller to read the register of CPLD through I2C bus. The specific command is: i2cget-y-f 1 0x31 0x00. If the reading is abnormal, it is determined that the I2C controller is abnormal. If the reading value is normal, further analyze the fault point.
4. Use I2C controller to read the register of PCA9641. The specific command is: i2cget-y-f 1 0x09 0x00. If reading fails, determine that PCA9641 is abnormal; if it is normal, read the register of PCA9548. The specific command is: i2cget-y-f 1 0x09; if reading fails, determine that PCA9548 is abnormal. If all readings are normal, it means that the I2C multiplexer device is normal. Further analysis of the fault point is required.
5. Open the channel of PCA9641 and open the corresponding channel of PCA9548. Then read the slave device on the corresponding channel, such as I2C slave device 1. The specific command is: i2cget-y-f 1 0x50 0x00. If the reading is abnormal, it means that the slave device 1 is faulty. The same is true for slave device 2.
6. If all the detection is completed and no fault points are found, the diagnosis can be made again.

Certainly, if the problem of I2C bus hung does not occur, the following process can be performed.

1. Use I2C controller to send a read command to CPLD. If it cannot be read or written normally, it is I2C controller fault. If the I2C controller reads CPLD normally, it needs to further investigate the fault point;
2. Read the register of I2C multiplexer. If it cannot be read normally, it is determined that I2C multiplexer is faulty;
3. Open the I2C channels corresponding to the slave devices in turn, and initiate reading operations to the slave devices. If the slave devices can read normally, the diagnosis process is ended;
4. If the slave device cannot respond to the read operation, it can be determined that the slave device is faulty.

An abnormality detection apparatus, a host device, a system and a non-transitory computer-readable storage medium provided by the embodiments of the present disclosure are described below, and the abnormality detection apparatus, the host device, the system and the non-transitory computer-readable storage medium described below can refer to the abnormality detection method described above correspondingly.

Figure 4:
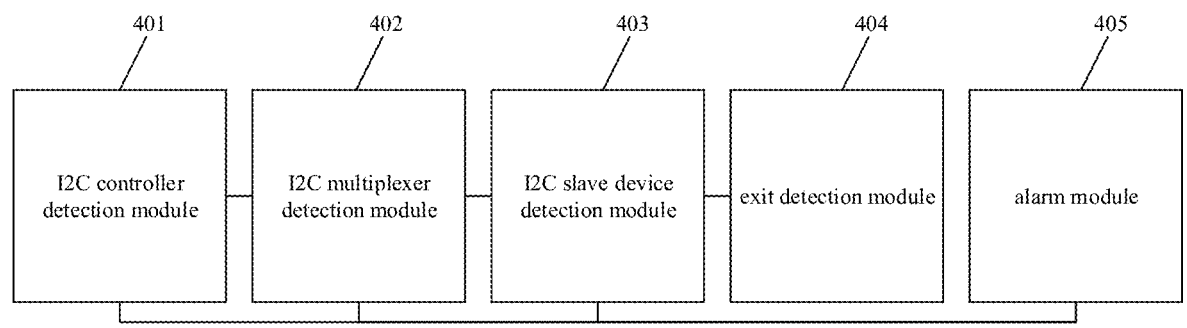
FIG. 4 is a structural block diagram of an abnormality detection apparatus provided by an embodiment of the present disclosure.

Please refer to FIG. 4, which is a structural block diagram of an abnormality detection apparatus provided by an embodiment of the present disclosure. The apparatus may include:

an I2C controller detection module 401, configured to shield all channels in an I2C multiplexer and detecting an I2C controller by using a CPLD to obtain a first detection result;

an I2C multiplexer detection module 402, configured to control the I2C controller to detect the I2C multiplexer to obtain a second detection result when the first detection result is that the I2C controller is normal;

an I2C slave device detection module 403, configured to open the channels and control the I2C controller to detect an I2C slave device connected to each channel to obtain a third detection result when the second detection result is that the I2C multiplexer is normal;

an exit detection module 404, configured to exit detection when the third detection result is that the I2C slave device is normal;

an alarm module 405, configured to output an alarm information corresponding to an abnormal result when there is an abnormal result in the first detection result, the second detection result and the third detection result.

In some embodiments, the apparatus may further include:

an abnormality detection module, configured to detect whether the I2C bus is abnormal by CPLD before shielding all channels in the I2C multiplexer;

the I2C controller detection module 401 is further configured to use CPLD to shield all channels in the I2C multiplexer when it is determined that the I2C bus is abnormal.

In some embodiments, the I2C controller detection module 401 may include:

a reset submodule, configured to control the CPLD to send a reset GPIO signal to the I2C multiplexer to reset the I2C multiplexer.

In some embodiments, the abnormality detection module may include:

a first detection submodule is configured to read the serial clock signal and the serial data signal in the I2C bus by CPLD, and determining whether the serial clock signal and the serial data signal jump within a preset time; If the serial clock signal or the serial data signal does not jump within the preset time, it is determined that the I2C bus is abnormal; If the serial clock signal or the serial data signal jumps within the preset time, the I2C bus is determined to be normal.

In some embodiments, the abnormality detection module may include:

a second detection submodule is configured to read the serial clock signal in the I2C bus by CPLD, and determine whether the time that the serial clock signal keeps low level exceeds the preset time; If the serial clock signal remains at a low level for more than a preset time, it is determined that the I2C bus is abnormal; If the serial clock signal remains at a low level for less than a preset time, the I2C bus is determined to be normal.

In some embodiments, the apparatus may further include:

a recheck module is configured to detect whether the I2C bus is abnormal again by CPLD after shielding all channels in the I2C multiplexer by CPLD; If the I2C bus is abnormal, it is determined that the I2C controller is abnormal; If the I2C bus is normal, enter the step of testing the I2C controller by using the CPLD.

In some embodiments, the recheck module can be configured to detect whether the serial clock signal and the serial data signal in the I2C bus jump within a preset time by using CPLD; If the serial clock signal and the serial data signal jump within the preset time, it is determined that the I2C bus is abnormal.

In some embodiments, the I2C controller detection module 401 may include:

a channel closing submodule is used to close all channels in the I2C multiplexer.

In some embodiments, the I2C multiplexer detection module 402 may include:

a first read operation initiating submodule is configured to control the I2C controller to initiate a read operation to the I2C multiplexer;

a first determining submodule, configured to determine that the I2C multiplexer is normal when it is determined that the I2C multiplexer has responded to the read operation and returned correct response data;

a second determining submodule is configured to determine that the I2C multiplexer is abnormal when it is determined that the I2C multiplexer does not respond to the read operation or returns wrong response data.

In some embodiments, the I2C slave device detection module 403 is specifically configured to:

open the channels in turn, and control the I2C controller to detect the I2C slave devices connected to the channels.

In some embodiments, the I2C slave device detection module 403 may include:

a second read operation initiating submodule, configured to control the I2C controller to initiate a read operation to the I2C slave device;

a third determining submodule, configured to determine that the I2C slave device is normal when it is determined that the I2C slave device has responded to the read operation and returned correct response data;

a fourth determining sub-module is configured to determine that the I2C slave device is abnormal when it is determined that the I2C slave device does not respond to the read operation or returns wrong response data.

In some embodiments, the I2C controller detection module 401 may include:

a simulation submodule is configured to simulate the I2C slave device by using CPLD and recording the specified data stored in the register of CPLD;

an instruction sending submodule is configured to control the I2C controller to send a reading instruction from the device register to the CPLD to read the specified data;

a determining sub-module is configured to determine whether the data read by the I2C controller is the same as the specified data; If the data read by the I2C controller is the same as the specified data, the I2C controller is determined to be normal; If the data read by the I2C controller is different from the specified data, it is determined that the I2C controller is abnormal.

In some embodiments, the I2C slave device detection module 403 may include:

a bus level value detection submodule is configured to detect whether the bus level value of I2C bus between I2C controller and I2C slave device in idle state conforms to I2C protocol specification by CPLD;

a communication value extraction submodule is configured to control the I2C controller to initiate a read operation to the I2C slave device when it is determined that the bus level value conforms to the I2C protocol specification, and extract the communication value interacted between the I2C controller and the I2C slave device during the read operation from the I2C bus by using CPLD; wherein, the communication values include I2C START signal value, I2C STOP signal value, slave device address, slave device ACK response information, serial clock signal low level value and serial data signal low level value;

a communication value detection submodule is configured to detect I2C START signal value, I2C STOP signal value, slave ACK response information, serial clock signal low level value and serial data signal low level value according to the I2C protocol specification, and determine whether the slave address to be tested used for controlling the I2C controller to initiate a read operation to the I2C slave is the same as the slave address extracted from the I2C bus;

an abnormality determining sub-module is configured to determine that the I2C slave device is abnormal when it is determined that the bus level value does not conform to the I2C protocol specification, or that any one of the I2C START signal value, I2C STOP signal value, slave device ACK response information, serial clock signal low level value and serial data signal low level value does not conform to the I2C protocol specification, or that the slave device address to be tested is different from the slave device address.

Figure 5:
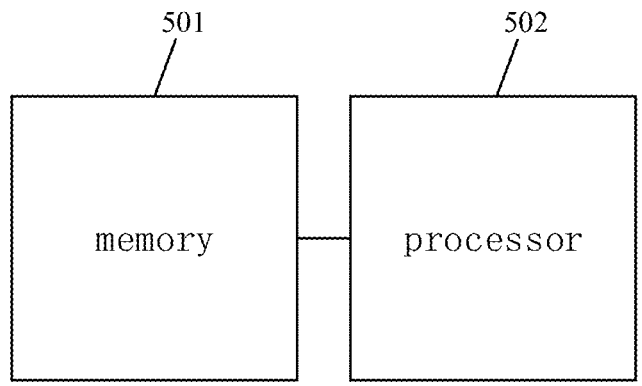
FIG. 5 is a structural block diagram of a host device provided by an embodiment of the present disclosure.

Please refer to FIG. 5, which is a structural block diagram of a host device provided by an embodiment of the present disclosure. The embodiment of the present disclosure also provides a host device, including:

a memory 501, configured to store computer programs;

a processor 502, configured to implement the steps of the abnormality detection method as described above when executing the computer program.

As the embodiment of the host device part and the embodiment of the abnormality detection method part correspond to each other, please refer to the description of the embodiment of the abnormality detection method part for the embodiment of the host device part, which will not be repeated here.

Figure 6:
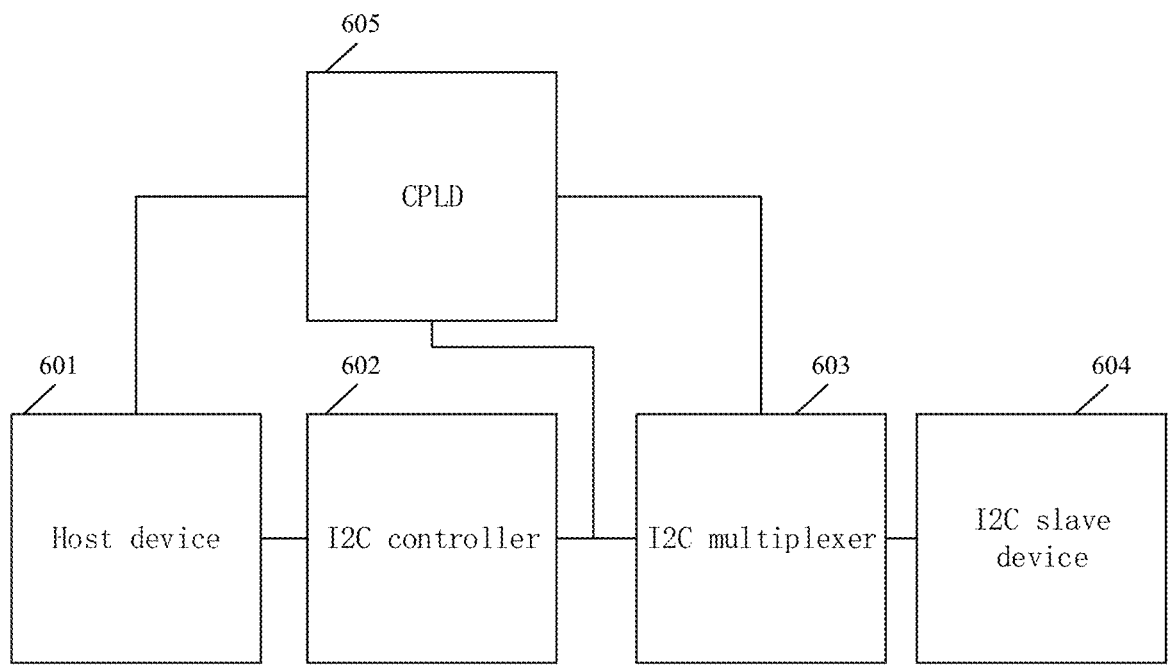
FIG. 6 is a structural block diagram of another abnormality detection system provided by an embodiment of the present disclosure.

Please refer to FIG. 6, which is a structural block diagram of another abnormality detection system provided by the embodiment of the present disclosure. The embodiment of the present disclosure also provides an abnormality detection system, including:

an I2C controller 602, an I2C multiplexer 603, an I2C slave device 604, a CPLD605, and a host device 601, wherein the host device 601 is configured to execute the above abnormality detection method.

In some embodiments, CPLD605 is connected to a serial clock line and a serial data line between I2C controller 602 and I2C multiplexer 603.

As the embodiment of the abnormality detection system part and the embodiment of the abnormality detection method part correspond to each other, please refer to the description of the embodiment of the abnormality detection method part for the embodiment of the abnormality detection system part, which is not repeated here.

Figure 7:
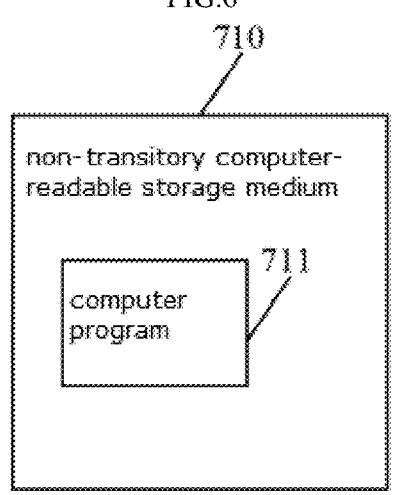
FIG. 7 is a structural block diagram of a non-transitory computer-readable storage medium provided by an embodiment of the present disclosure.

Please refer to FIG. 7, which is a structural block diagram of a non-transitory computer-readable storage medium provided by an embodiment of the present disclosure. The embodiment of the present disclosure also provides a non-transitory computer-readable storage medium 710, on which a computer program 711 is stored, and when the computer program 711 is executed by a processor, the steps of the abnormality detection method of any of the above embodiments are implemented.

Because the embodiment of the non-transitory computer-readable storage medium part corresponds to the embodiment of the abnormality detection method part, please refer to the description of the embodiment of the abnormality detection method part for the embodiment of the storage medium part, and will not be repeated here.

Each embodiment in the specification is described in a progressive way, and each embodiment focuses on the differences from other embodiments, so it is only necessary to refer to the same and similar parts between each embodiment. As for the device disclosed in the embodiment, because it corresponds to the method disclosed in the embodiment, the description is relatively simple, and the relevant points can only be described in the method part.

Professionals can further realize that the units and algorithm steps of each example described in connection with the embodiments disclosed herein can be realized by electronic hardware, computer software or a combination of the two. In order to clearly illustrate the interchangeability of hardware and software, the components and steps of each example have been generally described according to functions in the above description. Whether these functions are implemented in hardware or software depends on the specific application and design constraints of the technical scheme. Persons skilled in this field can use different methods to realize the described functions for each specific application, but this implementation should not be considered beyond the scope of the present disclosure.

The steps of a method or algorithm described in connection with the embodiments disclosed herein may be directly implemented in hardware, a software module executed by a processor, or a combination of the two. The software module can be placed in random access memory (RAM), internal memory, read-only memory (ROM), electrically programmable ROM, electrically erasable programmable ROM, register, hard disk, removable disk, CD-ROM, or any other storage medium known in the technical field.

Above, an abnormality detection method, apparatus, host device, system and non-transitory computer-readable storage medium provided by the present disclosure are introduced in detail. In this paper, specific examples are used to explain the principle and implementation of the present disclosure, and the description of the above examples is only used to help understand the method and core idea of the present disclosure. It should be pointed out that, for those skilled in the art, without departing from the principles of the present disclosure, several improvements and modifications can be made to the present disclosure, and these improvements and modifications also fall within the protection scope of the claims of the present disclosure.

The invention claimed is:

1. An abnormality detection method, comprising:

shielding all channels in an I2C (Inter-Integrated Circuit) multiplexer, and detecting an I2C controller by using a CPLD (Complex Programmable logic device) to obtain a first detection result;

when the first detection result is that the I2C controller is normal, controlling the I2C controller to detect the I2C multiplexer to obtain a second detection result;

when the second detection result is that the I2C multiplexer is normal, opening the channels, and controlling the I2C controller to detect an I2C slave device connected to each channel to obtain a third detection result;

when the third detection result is that the I2C slave device is normal, exiting detection;

when there is an abnormal result in the first detection result, the second detection result and the third detection result, outputting an alarm information corresponding to the abnormal result.

2. The abnormality detection method according to claim 1, wherein before shielding all channels in the I2C multiplexer, the method further comprises:

detecting whether an I2C bus is abnormal by using the CPLD;

in response to that the I2C bus is abnormal, using the CPLD to shield all channels in the I2C multiplexer;

in response to that the I2C bus is normal, closing all channels in the I2C multiplexer.

3. The abnormality detection method according to claim 2, wherein shielding all channels in the I2C multiplexer by using the CPLD comprises:

controlling the CPLD to send a reset GPIO (General-purpose input/output) signal to the I2C multiplexer to reset the I2C multiplexer.

4. The abnormality detection method according to claim 3, wherein controlling the I2C controller to detect the I2C slave device connected to each channel comprises:
using the CPLD to detect whether a bus level value of the I2C bus between the I2C controller and the I2C slave device in an idle state conforms to an I2C protocol specification;
when determining that the bus level value conforms to the I2C protocol specification, controlling the I2C controller to initiate a read operation to the I2C slave device, and extracting interactive communication values between the I2C controller and the I2C slave device when executing the read operation from the I2C bus by using the CPLD; wherein the communication values comprise an I2C START signal value, an I2C STOP signal value, a slave device address, an ACK response information of a slave device, a low level value of a serial clock signal and a low level value of a serial data signal;
using the I2C protocol specification to detect the I2C START signal value, the I2C STOP signal value, the ACK response information of the slave device, the low level value of the serial clock signal and the low level value of the serial data signal, and determining whether the slave device address to be tested used to control the I2C controller to initiate the read operation to the I2C slave device is the same as the slave device address extracted from the I2C bus;
determining that the I2C slave device is abnormal when determining that the bus level value does not conform to the I2C protocol specification, or that any of the I2C START signal value, the I2C STOP signal value, the ACK response information of the slave device, the low level value of the serial clock signal and the low level value of the serial data signal does not conform to the I2C protocol specification, or that the slave device address to be tested is different from the slave device address.

5. The abnormality detection method according to claim 2, wherein detecting whether the I2C bus is abnormal by using the CPLD comprises:
reading a serial clock signal and a serial data signal in the I2C bus by using the CPLD, and determining whether the serial clock signal and the serial data signal jump within a preset time;
in response to that the serial clock signal and the serial data signal do not jump within the preset time, determining that the I2C bus is abnormal.

6. The abnormality detection method according to claim 5, further comprising:
in response to that the serial clock signal or the serial data signal jumps within the preset time, determining that the I2C bus is normal.

7. The abnormality detection method according to claim 2, wherein detecting whether the I2C bus is abnormal by using the CPLD comprises:
reading a serial clock signal in the I2C bus by using the CPLD, and determining whether the serial clock signal remains at a low level for more than a preset time;
in response to that the serial clock signal remains at the low level for more than the preset time, determining that the I2C bus is abnormal.

8. The abnormality detection method according to claim 7, further comprising:
in response to that the serial clock signal remains at the low level for less than the preset time, determining that the I2C bus is normal.

9. The abnormality detection method according to claim 2, wherein after using the CPLD to shield all channels in the I2C multiplexer, the method further comprises:
detecting whether the I2C bus is abnormal again by using the CPLD;
in response to that the I2C bus is abnormal, determining that the I2C controller is abnormal;
in response to that the I2C bus is normal, entering a step of detecting the I2C controller by using the CPLD.

10. The abnormality detection method according to claim 9, wherein detecting whether the I2C bus is abnormal again by using the CPLD comprises:
detecting whether a serial clock signal and a serial data signal in the I2C bus jump within a preset time by using the CPLD;
in response to that the serial clock signal and the serial data signal jump within a preset time, determining that the I2C bus is abnormal.

11. The abnormality detection method according to claim 2, wherein controlling the I2C controller to detect the I2C slave device connected to each channel comprises:
using the CPLD to detect whether a bus level value of the I2C bus between the I2C controller and the I2C slave device in an idle state conforms to an I2C protocol specification;
when determining that the bus level value conforms to the I2C protocol specification, controlling the I2C controller to initiate a read operation to the I2C slave device, and extracting interactive communication values between the I2C controller and the I2C slave device when executing the read operation from the I2C bus by using the CPLD; wherein the communication values comprise an I2C START signal value, an I2C STOP signal value, a slave device address, an ACK response information of a slave device, a low level value of a serial clock signal and a low level value of a serial data signal;
using the I2C protocol specification to detect the I2C START signal value, the I2C STOP signal value, the ACK response information of the slave device, the low level value of the serial clock signal and the low level value of the serial data signal, and determining whether the slave device address to be tested used to control the I2C controller to initiate the read operation to the I2C slave device is the same as the slave device address extracted from the I2C bus;
determining that the I2C slave device is abnormal when determining that the bus level value does not conform to the I2C protocol specification, or that any of the I2C START signal value, the I2C STOP signal value, the ACK response information of the slave device, the low level value of the serial clock signal and the low level value of the serial data signal does not conform to the I2C protocol specification, or that the slave device address to be tested is different from the slave device address.

12. The abnormality detection method according to claim 1, wherein detecting the I2C controller by using the CPLD comprises:
simulating the I2C slave device by using the CPLD, and recording specified data stored in a register of the CPLD;

controlling the I2C controller to send an instruction of reading slave device register to the CPLD to read the specified data;

determining whether data read by the I2C controller is same as the specified data;

determining that the I2C controller is normal in response to that the data read by the I2C controller is the same as the specified data;

determining that the I2C controller is abnormal in response to that the data read by the I2C controller is different from the specified data.

13. The abnormality detection method according to claim 1, wherein controlling the I2C controller to detect the I2C multiplexer comprises:

controlling the I2C controller to initiate a read operation to the I2C multiplexer;

determining that the I2C multiplexer is normal when determining that the I2C multiplexer responds to the read operation and returns correct response data;

determining that the I2C multiplexer is abnormal when determining that the I2C multiplexer does not respond to the read operation or returns wrong response data.

14. The abnormality detection method according to claim 1, wherein opening the channels, and controlling the I2C controller to detect the I2C slave device connected to each channel comprises:

sequentially opening the channels and controlling the I2C controller to detect the I2C slave devices connected to the channels.

15. The abnormality detection method according to claim 1, wherein controlling the I2C controller to detect the I2C slave device connected to each channel comprises:

controlling the I2C controller to initiate a read operation to the I2C slave device;

determining that the I2C slave device is normal when determining that the I2C slave device responds to the read operation and returns correct response data;

determining that the I2C slave device is abnormal when determining that the I2C slave device does not respond to the read operation or returns wrong response data.

16. The abnormality detection method according to claim 1, wherein controlling the I2C controller to detect the I2C slave device connected to each channel comprises:

using the CPLD to detect whether a bus level value of an I2C bus between the I2C controller and the I2C slave device in an idle state conforms to an I2C protocol specification;

when determining that the bus level value conforms to the I2C protocol specification, controlling the I2C controller to initiate a read operation to the I2C slave device, and extracting interactive communication values between the I2C controller and the I2C slave device when executing the read operation from the I2C bus by using the CPLD; wherein the communication values comprise an I2C START signal value, an I2C STOP signal value, a slave device address, an ACK response information of a slave device, a low level value of a serial clock signal and a low level value of a serial data signal;

using the I2C protocol specification to detect the I2C START signal value, the I2C STOP signal value, the ACK response information of the slave device, the low level value of the serial clock signal and the low level value of the serial data signal, and determining whether the slave device address to be tested used to control the I2C controller to initiate the read operation to the I2C slave device is same as the slave device address extracted from the I2C bus;

determining that the I2C slave device is abnormal when determining that the bus level value does not conform to the I2C protocol specification, or that any of the I2C START signal value, the I2C STOP signal value, the ACK response information of the slave device, the low level value of the serial clock signal and the low level value of the serial data signal does not conform to the I2C protocol specification, or that the slave device address to be tested is different from the slave device address.

17. The abnormality detection method according to claim 16, wherein using the CPLD to detect whether the bus level value of the I2C bus between the I2C controller and the I2C slave device in an idle state conforms to the I2C protocol specification comprises:

using the CPLD to detect whether the serial clock signal and serial data signal in the I2C bus between the I2C controller and the I2C slave device conform to the I2C protocol specification.

18. A host device, comprising:

a memory, configured to store a computer program;

a processor, configured to implement an abnormality detection method when executing the computer program, wherein the abnormality detection method comprises:

shielding all channels in an I2C (Inter-Integrated Circuit) multiplexer, and detecting an I2C controller by using a CPLD (Complex Programmable logic device) to obtain a first detection result;

when the first detection result is that the I2C controller is normal, controlling the I2C controller to detect the I2C multiplexer to obtain a second detection result;

when the second detection result is that the I2C multiplexer is normal, opening the channels, and controlling the I2C controller to detect an I2C slave device connected to each channel to obtain a third detection result;

when the third detection result is that the I2C slave device is normal, exiting detection;

when there is an abnormal result in the first detection result, the second detection result and the third detection result, outputting an alarm information corresponding to the abnormal result.

19. An abnormality detection system comprising an I2C controller, an I2C (Inter-Integrated Circuit) multiplexer, an I2C slave device, a CPLD (Complex Programmable logic device) and a host device, wherein the host device is configured to execute an abnormality detection method, wherein the abnormality detection method comprises:

shielding all channels in the I2C multiplexer, and detecting the I2C controller by using the CPLD to obtain a first detection result;

when the first detection result is that the I2C controller is normal, controlling the I2C controller to detect the I2C multiplexer to obtain a second detection result;

when the second detection result is that the I2C multiplexer is normal, opening the channels, and controlling the I2C controller to detect the I2C slave device connected to each channel to obtain a third detection result;

when the third detection result is that the I2C slave device is normal, exiting detection;

when there is an abnormal result in the first detection result, the second detection result and the third detection result, outputting an alarm information corresponding to the abnormal result.

20. The abnormality detection system according to claim 19, wherein the CPLD is connected with a serial clock line and a serial data line between the I2C controller and the I2C multiplexer.

* * * * *